US006147143A

United States Patent [19]
Araki et al.

[11] Patent Number: 6,147,143
[45] Date of Patent: Nov. 14, 2000

[54] RUBBER COMPOSITION AND PNEUMATIC TIRE USING SAID RUBBER COMPOSITION

[75] Inventors: Shunji Araki; Kazuhiro Yanagisawa, both of Tokyo, Japan

[73] Assignee: Bridgestone Corporation, Tokyo, Japan

[21] Appl. No.: 08/934,197

[22] Filed: Sep. 19, 1997

[30] Foreign Application Priority Data

Dec. 16, 1996 [JP] Japan ................................ 8-335975

[51] Int. Cl.$^7$ .............................. C08K 5/54; B60C 11/00
[52] U.S. Cl. ..................... 523/213; 523/212; 524/262; 524/493; 524/495; 152/209.1
[58] Field of Search ................................ 524/262, 493, 524/495; 523/213, 212; 152/209 R

[56] References Cited

U.S. PATENT DOCUMENTS

| | | | |
|---|---|---|---|
| 5,605,951 | 2/1997 | Sandstrom et al. | 524/494 |
| 5,674,932 | 10/1997 | Agostini et al. | 524/430 |
| 5,780,538 | 7/1998 | Cohen et al. | 524/494 |

FOREIGN PATENT DOCUMENTS

| | | | |
|---|---|---|---|
| 50-29741 | 9/1975 | Japan | C08J 3/24 |
| 51-20208 | 6/1976 | Japan | C08L 7/00 |
| 63-270751 | 11/1988 | Japan | C08L 9/00 |
| 64-9248 | 1/1989 | Japan | C08L 7/00 |
| 3-239737 | 10/1991 | Japan | C08L 9/06 |
| 3-252431 | 11/1991 | Japan | C08L 9/00 |
| 3-252433 | 11/1991 | Japan | C08L 21/00 |
| 4-224840 | 8/1992 | Japan | C08L 9/00 |
| 5-51484 | 3/1993 | Japan | C08L 7/00 |
| 5-271477 | 10/1993 | Japan | C08L 21/00 |
| 7-48476 | 2/1995 | Japan | C08L 7/00 |

Primary Examiner—James J. Seidleck
Assistant Examiner—Olga Asinovsky
Attorney, Agent, or Firm—Sughrue, Mion, Zinn, Macpeak & Seas, PLLC

[57] ABSTRACT

The present invention provides a rubber composition and a pneumatic tire using the rubber composition. The rubber composition which comprises: a rubber component comprising a styrene-butadiene copolymer rubber or a blend of the styrene-butadiene copolymer rubber and another conjugated diene base rubber with the styrene-butadiene copolymer rubber being 70% by weight or more of the entire blend, and the entire content of styrene is 30 to 40% by weight of the entire rubber component; silica in an amount of 10 to 60 parts by weight per 100 parts by weight of the rubber component; a specific silane coupling agent, i.e., a bis(alkoxysilylalkyl)polysulfide having a polysulfide chain in which the distribution of sulfur is specified, in an amount of 1 to 20% by weight of the amount of silica; and carbon black, the sum of the amount of silica and carbon black being 60 to 130 parts by weight per 100 parts by weight of the rubber component. The pneumatic tire has excellent wet skid resistance, excellent grip performance on a dry road surface, and excellent abrasion resistance.

11 Claims, No Drawings

RUBBER COMPOSITION AND PNEUMATIC TIRE USING SAID RUBBER COMPOSITION

BACKGROUND OF THE INVENTION

1. Field of the Invention

The present invention relates to a rubber composition and to a pneumatic tire using the rubber composition, and more particularly, to a rubber composition and to a pneumatic tire using the rubber composition in which wet skid resistance and grip performance on a dry road surface are excellent and abrasion resistance can be improved.

2. Description of the Related Art

Heretofore, silica has been used for the rubber composition of a tire so as to improve the performances thereof.

For example, Japanese Patent Application Laid-Open (hereinafter, "JP-A") No. Sho-63-270751 and JP-A No. Sho-64-9248 disclose a rubber composition compounded with a predetermined amount of silica in order to obtain a high performance tire.

Further, JP-A No. Hei-3-252431, JP-A No. Hei-3-252433, and JP-A No. Hei-3-25431 disclose a pneumatic tire in which a rubber composition compounded with silica, silane coupling agent, and a specific polymer is used for a tread in order to improve wet skid resistance, rolling resistance, and abrasion resistance.

Several other tread rubber compositions compounded silica are proposed in order to improve the performances of a tire (e.g., JP-A No. Hei-4-224840, JP-A No. Hei-5-271477, JP-A No. Hei-5-51484, JP-A No. Hei-7-48476, and the like).

However, silica particles tend to cohere together due to hydrogen bonding of silanol groups which are functional groups on the surfaces of the silica particles. For improving the dispersion of silica particles into rubber, the mixing time must be increased. When dispersion of silica particles into rubber is insufficient, a problem arises in that processability in processes such as extrusion and the like deteriorates due to the increase in the Mooney viscosity.

Moreover, the surfaces of the silica particles are acidic. Therefore, there are problems in that basic substances used as vulcanization accelerators are absorbed such that vulcanization is not carried out sufficiently, and a sufficient modulus of elasticity is not obtained.

In order to solve these problems, various types of silane coupling agents have been developed. For example, use of a silane coupling agent as a reinforcing material is described in Japanese Patent Application Publication (hereinafter, "JP-B") No. Sho-50-29741. However, the use of a silane coupling agent as a reinforcing material is still insufficient for improving fracture properties, workability, and processability of a rubber composition to high standards. Rubber compositions in which a combination of silica and silane coupling agent is used as a reinforcing material are described in JP-B No. Sho-51-20208 and others. However, this method of using a combination of silica and silane coupling agent as a reinforcing material has a drawback in that flow of the uncured compounded rubber is markedly inferior and workability and processability deteriorate, although reinforcement of the compounded rubber can be remarkably improved and fracture properties are improved.

The drawbacks of the conventional technologies in which silane coupling agents are used arise due to the following mechanism. When the mixing temperature of rubber is low, the silanol group on the surface of the silica does not react sufficiently with the silane coupling agent, and as a result, the sufficient reinforcing effect is not obtained. Moreover, some of the alcohol formed by the reaction of the silanol group on the surface of the silica and the silane coupling agent does not vaporize completely during mixing because of the low mixing temperature, and the residual alcohol in the rubber vaporizes during an extrusion process so as to form blisters.

On the other hand, when mixing is conducted at high temperatures of 150° C. or more, the silanol group on the surface of the silica and the silane coupling agent sufficiently react with each other, and as a result, the reinforcing property is improved. Dispersion of the silica into the rubber is also improved, a rubber composition having a good abrasion resistance is obtained, and the formation of blisters in an extrusion process is suppressed. However, in this temperature range, gelation of the polymer caused by the silane coupling agent takes place simultaneously, and the Mooney viscosity markedly increases. Thus, processing in later stages becomes impossible in actuality.

Therefore, when a silane coupling agent is used in combination with silica, a multistep mixing must be conducted at a temperature lower than 150° C., and marked decrease in productivity is inevitable. When the mixing is conducted at a low temperature, dispersion of silica and carbon black into the rubber is insufficient and abrasion resistance deteriorates.

SUMMARY OF THE INVENTION

Accordingly, an object of the present invention is to provide a rubber composition and a pneumatic tire using the rubber composition in which gelation of a polymer due to a silane coupling agent during mixing at high temperatures of 150° C. or more is suppressed without a deterioration in workability, in which wet skid resistance and grip performance on a dry road surface are excellent, and in which abrasion resistance can be improved.

In order to achieve the above object, a rubber composition of the present invention which comprises: a rubber component comprising a styrene-butadiene copolymer rubber, or a blend of the styrene-butadiene copolymer rubber and another conjugated diene base rubber with the styrene-butadiene copolymer rubber being 70% by weight or more of the entire blend, and the entire content of styrene is 30 to 40% by weight of the entire rubber component; silica in an amount of 10 to 60 parts by weight, preferably 20 to 50 parts by weight, per 100 parts by weight of the rubber component; in an amount of 1 to 20% by weight, preferably 3 to 15% by weight, of the amount of silica, a silane coupling agent represented by following general formula (1):

$$(C_nH_{2n+1}O)_3Si\text{---}(CH_2)_m\text{---}S_y\text{---}(CH_2)_m\text{---}Si(C_nH_{2n+1}O)_3 \qquad (1)$$

(wherein n represents an integer of 1 to 3, m represents an integer of 1 to 9, y represents a positive number of 1 or more which has a distribution), and in which the content of trisulfide silane is 20% or more based on the entire polysulfide silane, and the content of high polysulfide silane, in which y represents 5 or a number larger than 5, is 50% or less based on the entire polysulfide silane; and carbon black, the sum of the amount of silica and carbon black being 60 to 130 parts by weight.

Further, it is preferable that the content of trisulfide silane in the polysulfide silane coupling agent molecule represented by the above general formula (1) is 30% or more based on the entire polysulfide silane and that the content of high polysulfide silane, in which y represents 5 or a number larger than 5, is 40% or less based on the entire polysulfide silane.

Moreover, it is preferable that the amount of styrene-butadiene copolymer rubber obtained by emulsion polymerization is 40% by weight or more of the percentage by weight of the styrene-butadiene copolymer rubber in the rubber component.

Furthermore, it is preferable that a nitrogen absorption specific surface area ($N_2SA$) of the carbon black is 120 to 160 $m^2$/g and a dibutyl phthalate oil absorption (DBP) thereof is 120 to 150 ml/100 g.

Still further, the present invention relates to a pneumatic tire which is manufactured by using the rubber composition for tread rubber.

DESCRIPTION OF THE PREFERRED EMBODIMENTS

A rubber component of the rubber composition in the present invention comprises a styrene-butadiene copolymer rubber, or a blend of the styrene-butadiene copolymer rubber and another conjugated diene base rubber with the styrene-butadiene copolymer rubber being 70% by weight or more of the entire blend, preferably a styrene-butadiene copolymer rubber obtained by emulsion polymerization in an amount of 40% by weight or more of the percentage by weight of the styrene-butadiene copolymer rubber, and the entire content of styrene is 30 to 40% by weight of the entire rubber component. When the percentage of styrene-butadiene copolymer rubber is less than 70% by weight of the entire rubber component, wet skid resistance and grip performance on a dry road surface deteriorate. Further, when the entire content of styrene is less than 30% by weight of the entire rubber component, wet skid resistance and grip performance o n a dry road surface deteriorate, and when the entire content of styrene exceeds 40% by weight thereof, abrasion resistance deteriorates. As the other conjugated diene base rubbers, polybutadiene, natural rubber, synthetic cis 1,4-polyisoprene rubber, butyl rubber, halogenated butyl rubber, and the like can be used.

The silica used in the present invention is a synthetic silica manufactured by a precipitation process. Preferably, a synthetic silica through a precipitation process having a BET specific surface area of 140 to 280 $m^2$/g and a dibutyl phthalate oil absorption of 150 to 300 ml/100 g is used. Specific examples of the silica include NIPSIL AQ manufactured by NIPPON SILICA INDUSTRIAL Co., Ltd.; ULTRASIL VN3 and BV 3370GR manufactured by DEGUSSA AG., a German company; RP1165MP, Zeosil 165GR, and Zeosil 175MP manufactured by RHÔNE-POULENC Co.; and Hisil233, Hisil210, Hisil255, Hisil2000 manufactured by PPG Co. (all trade names). However, the silica used in the present invention is not limited to these examples. The amount of silica used is 10 to 60 parts by weight, preferably 20 to 50 parts by weight, per 100 parts by weight of the conjugated diene base rubber. When the amount of silica is less than 10 parts by weight, wet skid resistance deteriorates. On the other hand, when the amount of silica exceeds 60 parts by weight, abrasion resistance deteriorates.

The silane coupling agent used in the present invention is a silane coupling agent represented by following general formula (1):

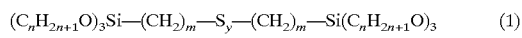

$$(C_nH_{2n+1}O)_3Si\text{---}(CH_2)_m\text{---}S_y\text{---}(CH_2)_m\text{---}Si(C_nH_{2n+1}O)_3 \qquad (1)$$

(wherein n represents an integer of 1 to 3, m represents an integer of 1 to 9, and y represents a positive number of 1 or more which has a distribution). It is necessary that the content of trisulfide silane is 20% or more, preferably 30% or more, based on the entire polysulfide silane and that the content of high polysulfide silane, in which y represents 5 or a number greater than 5, is 50% or less, preferably 40% or less. By using this silane coupling agent, the effect of suppressing gelation of a polymer during mixing at high temperatures of 150° C. or more is obtained, and the reduction of productivity due to the increase in the Mooney viscosity can be prevented.

The amount of silane coupling agent used is 1 to 20% by weight, preferably 3 to 15% by weight, of the weight of silica. When the amount of silane coupling agent used is less than 1% by weight, a sufficient reinforcing effect is not obtained. On the other hand, when the amount of silane coupling agent exceeds 20% by weight of the weight of silica, the modulus of elasticity of a cured rubber increases too much. Therefore, such amounts are not preferable.

To effectively exhibit the characteristics of the rubber composition of the present invention, the mixing temperature is preferably 150° C. or more and 180° C. or less. When the mixing temperature is less than 150° C., the silane coupling agent does not react sufficiently with the silica, and blisters are formed during extrusion. On the other hand, when the temperature exceeds 180° C., gelation of the polymer takes place such that the Mooney viscosity increases. Therefore, such temperatures are not preferable from the standpoint of processing.

The mechanism for preventing gelation of a polymer and improving abrasion resistance at a mixing temperature of 150° C. or more is described hereinafter on the basis of the results of studies and considerations of the results.

A silane coupling agent generally used in the tire industry (trade name: Si69, manufactured by DEGUSSA AG., a German company) was heated in an oven at 150° C. for 2 hours and cooled. Thereafter, the treated silane coupling agent was analyzed by high performance liquid chromatography. It was confirmed from the results of the analysis that the components having sulfur chains of —$S_6$— or longer in the molecule were decreased as compared to the original material, and the free sulfur and components having sulfur chains of —$S_4$— or shorter in the molecule were increased as compared to the original material. In other words, it was thought that the components having sulfur chains of —$S_6$— or longer in the molecule were decomposed by the heating at a high temperature. It can be surmised that gelation of a polymer takes place during mixing at a high temperature because radicals are formed during the decomposition of the silane coupling agent or because products formed by the decomposition work as a source of sulfur. Therefore, it was believed that gelation of a polymer is suppressed during mixing at temperatures of 150° C. or more when the silane coupling agent originally contains smaller amounts of the components having long sulfur chains in the molecule. As the result of intensive studies in accordance with the above idea, it was found that, when the proportion of the components having short sulfur chains in the molecule among the components having sulfur chains of various lengths in the molecule was increased to a specific value or more, gelation of the polymer was actually suppressed. Moreover, dispersion of silica into rubber was improved because the reaction of the silanol group on the surface of the silica and the silane coupling agent took place sufficiently due to mixing at a high temperature, and abrasion resistance was improved.

Carbon black is used along with silica as a filler for the rubber composition of the present invention. The sum of the amount of carbon black and silica is 60 to 130 parts by weight. When the sum of the amount of carbon black and silica is less than 60 parts by weight, the tensile strength at the time of cutting of a rubber is low and abrasion resistance deteriorates. On the other hand, when the sum of the amount of carbon black and silica exceeds 130 parts by weight, dispersion of carbon black and silica into rubber is insufficient and abrasion resistance deteriorates again.

The carbon black having a nitrogen absorption specific surface area ($N_2SA$) of 120 to 160 $m^2/g$ and a dibutyl phthalate oil absorption (DBP) of 120 to 150 ml/100 g is preferably used. DBP is determined in accordance with ASTM D2414-93 and $N_2SA$ is determined in accordance with ASTM D4820.

Into the rubber composition of the present invention, compounding ingredients which are generally used such as antioxidants, zinc oxide, stearic acid, softeners, and the like can be used.

EXAMPLES

The present invention is described more specifically with reference to the following Examples.

Various rubber compositions were prepared in accordance with formulations given in the following Tables 2 and 3. The silane coupling agents used in the formulations are expressed by the following formula:

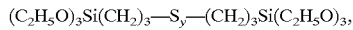

$(C_2H_5O)_3Si(CH_2)_3—S_y—(CH_2)_3Si(C_2H_5O)_3$, and —$S_y$— in this formula has the distribution shown in Table 1. The distributions of various sulfur chain components (—$S_y$—) shown in Table 1 were obtained by calculation from peak areas (%) obtained by high performance liquid chromatography (HPLC). The analysis by HPLC is described in detail hereinafter.

(Conditions of analysis by HPLC)
HPLC: manufactured by TOSOH CORPORATION, HLC-8020
UV detector: manufactured by TOSOH CORPORATION, UV-8010 (254 nm)
Recorder: manufactured by TOSOH CORPORATION, SUPER SYSTEM CONTROLLER SC-8010
Column: manufactured by TOSOH CORPORATION, TSK-gel ODS-80$T_M$CTR (inner diameter: 4.6 mm, length: 10 cm) Temperature at the time of measurement: 25° C.
Concentration of sample: 6 mg/10 cc (6 mg per 10 cc of acetonitrile solution
Amount of sample injected: 20 μl
Condition of elusion: flow rate of 1 cc/min
A sample was eluted for 2 minutes with a mixed solution of acetonitrile and water having a fixed composition of 1:1, and then with a mixed solution having a varying composition with such a gradient that the solution contained 100% of acetonitrile after 18 minutes.

TABLE 1

|  | -$S_2$- | -$S_3$- | -$S_4$- | -$S_5$- | -$S_6$- | -$S_7$- | -$S_8$- | -$S_9$- | -$S_5$- or more |
|---|---|---|---|---|---|---|---|---|---|
| sample A*1) | 2.53 | 15.85 | 23.77 | 24.27 | 18.33 | 10.24 | 3.83 | 1.18 | 57.85 |
| sample B | 7.16 | 30.33 | 29.38 | 18.29 | 8.24 | 3.28 | 0.96 | 2.36 | 33.13 |
| sample C | 17.64 | 44.14 | 23.40 | 8.49 | 1.92 | 1.06 | 3.37 | 0 | 14.83 |
| sample D | 8.1 | 59.0 | 18.7 | 14.2 | 0 | 0 | 0 | 0 | 14.2 |

TABLE 1-continued

|  | -$S_2$- | -$S_3$- | -$S_4$- | -$S_5$- | -$S_6$- | -$S_7$- | -$S_8$- | -$S_9$- | -$S_5$- or more |
|---|---|---|---|---|---|---|---|---|---|
| sample E | 11.1 | 62.8 | 26.1 | 0 | 0 | 0 | 0 | 0 | 0 |
| sample F | 97.3 | 2.7 | 0 | 0 | 0 | 0 | 0 | 0 | 0 |

Samples A to F in Table 1 were obtained as follows.
Sample A
Si69, manufactured by DEGUSSA AG., a German company
Samples B and C
Samples B and C were synthesized in accordance with the method described in JP-A No. Hei-7-228588 from anhydrous sodium sulfide and sulfur in the following mol ratios:
sample B 1:2
sample C 1:1.5
Sample D
506 g (1 mol) of sample B which has a polysulfide distribution shown in Table 1 was weighed and charged into a 1-liter flask. 78.7 g (0.3 mol) of triethyl phosphite was added dropwise into the flask through a dropping funnel over 2 hours while stirring the solution within the flask. During this time, the temperature within the flask rose from 25° C. to 50° C. The stirring was conducted for another 3 hours and a portion of the solution was checked through gas chromatography. It was found that a peak assigned to triethyl phosphite was diminished and that the reaction took place. Table 1 shows the results of measurement of polysulfide distributions in the obtained composition through liquid chromatography. It shows that high polysulfide portions selectively reacted with the phosphite.
Sample E
538 g (1 mol) of silane (sample A: Si69 manufactured by DEGUSSA AG., a German company), which has the polysulfide distribution shown in Table 1 and which has an average of four sulfur atoms per polysulfide chain, was weighed and charged into a 1-liter flask. 166.2 g (1 mol) of triethyl phosphite was added dropwise into the flask through a dropping funnel over 2 hours while stirring the solution within the flask. During this time, the flask was cooled by water in order to maintain the temperature therewithin at 50° C. or lower. Next, the flask was heated and stirred for 3 hours at 40 to 50° C. Thereafter, sample E was obtained in the same way as sample D.
Sample F
Sample F was synthesized in accordance with the method described in JP-A No. Hei-8-259739.

Various types of rubber compositions in Examples and Comparative Examples were prepared by using the obtained samples. Then, 225/50R16 size tires having treads formed by respective rubber compositions in Examples and Comparative Examples were manufactured and tested by using an 8J-16 rim. The obtained rubber compositions were evaluated with respect to Mooney viscosity in accordance with the following method. Further, the manufactured tires were evaluated with respect to abrasion resistance, grip performance on a dry road surface, and wet skid resistance in accordance with the following methods.

(1) Mooney Viscosity
Mooney viscosity was measured in accordance with the method of Japanese Industrial Standard K6300 for a time of 4 minutes at a temperature of 130° C. after preheating for 1 minute. The obtained result is expressed as an index with Comparative Example 1 being 100. The smaller the index, the lower the Mooney viscosity and the better the processability.

(2) Abrasion Resistance

Four test tires were placed on a 2000 cc passenger vehicle. After the vehicle was run about 30,000 km, the depth of a groove remained at the tire was measured. The abrasion resistance was obtained in accordance with the following formula: {(running distance (km) of test tire)/(depth (mm) of initial groove–depth (mm) of groove remained at the tire after the test)/{(running distance (km) of tire of Comparative Example 1)/(depth (mm) of initial groove–depth (mm) of groove remained at tire of Comparative Example 1 after the test)}. The larger the numerical value of the index, the better the abrasion resistance.

(3) Grip Performance on Dry Road Surface

A vehicle on which test tires were placed was run on a circuit and the average lap time of 8 to 10 laps was measured. The obtained result is expressed as an index with the reciprocal of the lap time of Comparative Example 1 being 100. The larger the numerical value of the index, the better the grip performance.

(4) Wet Skid Resistance

On a wet concrete road surface on which there is water of 3 mm depth, rapid braking is applied at a speed of 80 km/hour. The distance between the locking of wheels and the stopping thereof was measured, and the wet skid resistance of the test tire was evaluated in accordance with the following formula:

{(stopping distance of tire of Comparative Example 1)/(stopping distance of test tire)}×100.

The larger the numerical value of the index, the better the wet skid resistance.

The obtained results are illustrated in the following Tables 2 and 3.

TABLE 2

| Example | | | 1 | 2 | 3 | 4 | | 5 | 6 | 7 |
| Comparative Example | 1 | 2 | | | | | 3 | | | |
|---|---|---|---|---|---|---|---|---|---|---|
| Formulation (parts by weight) | | | | | | | | | | |
| *1712*[1] | | 27.5 | 27.5 | 27.5 | 27.5 | 27.5 | 27.5 | 27.5 | 20.6 | — | 27.5 |
| 0120*[2] | | 110.0 | 110.0 | 110.0 | 110.0 | 110.0 | 110.0 | 110.0 | — | — | 110.0 |
| 0202*[3] | | — | — | — | — | — | — | — | 30 | 75 | — |
| TAFDEN 2530*[4] | | — | — | — | — | — | — | — | 75.6 | — | — |
| BR31*[5] | | — | — | — | — | — | — | — | 34.38 | — | — |
| carbon black*[6] | type | N134 | N134 | N134 | N134 | N134 | N134 | N134 | N134 | N234 | N134 |
| | amount | 70 | 70 | 70 | 70 | 70 | 70 | 70 | 70 | 100 | 70 |
| silica*[7] | | 30 | 30 | 30 | 30 | 30 | 30 | 30 | 30 | 10 | 40 |
| silane coupling agent | type | A | A | B | C | D | E | F | C | C | C |
| | amount | 3.0 | 3.0 | 3.0 | 3.0 | 3.0 | 3.0 | 3.0 | 3.0 | 1.0 | 4.0 |
| aromatic oil | | 12.5 | 12.5 | 12.5 | 12.5 | 12.5 | 12.5 | 12.5 | 23.8 | 40.6 | 12.5 |
| stearic acid | | 1 | 1 | 1 | 1 | 1 | 1 | 1 | 1 | 1 | 1 |
| antioxidant*[8] | | 1.5 | 1.5 | 1.5 | 1.5 | 1.5 | 1.5 | 1.5 | 1.5 | 1.5 | 1.5 |
| zinc oxide | | 3.0 | 3.0 | 3.0 | 3.0 | 3.0 | 3.0 | 3.0 | 3.0 | 3.0 | 3.0 |
| vulcanization accelerator DM*[9] | | 0.6 | 0.6 | 0.6 | 0.6 | 0.6 | 0.6 | 0.6 | 0.6 | 0.6 | 0.6 |
| vulcanization accelerator DPG*[10] | | 0.3 | 0.3 | 0.3 | 0.3 | 0.3 | 0.3 | 0.3 | 0.3 | 0.3 | 0.3 |
| vulcanization accelerator NS*[11] | | 2.3 | 2.3 | 2.3 | 2.3 | 2.3 | 2.3 | 2.3 | 2.3 | 2.3 | 2.3 |
| sulfur | | 1.9 | 1.9 | 1.9 | 1.9 | 1.9 | 1.9 | 1.9 | 1.9 | 1.9 | 1.9 |
| masterbatch temperature (° C.) | | 142 | 164 | 166 | 168 | 165 | 166 | 164 | 166 | 164 | 167 |
| Results of evaluation | | | | | | | | | | | |
| entire content of styrene | | 32.7 | 32.7 | 32.7 | 32.7 | 32.7 | 32.7 | 32.7 | 31.1 | 34.5 | 32.7 |
| Mooney viscosity (index) | | 100 | 168 | 98 | 91 | 90 | 92 | 84 | 87 | 97 | 97 |
| abrasion resistance (index) | | 100 | — | 108 | 104 | 106 | 105 | 87 | 106 | 118 | 107 |
| dry grip (index) | | 100 | — | 103 | 103 | 104 | 103 | 93 | 102 | 106 | 106 |
| wet grip (index) | | 100 | — | 103 | 104 | 104 | 104 | 99 | 102 | 102 | 109 | mastermatch temperature: a measured temperature of masterbatch immediately after mixing In Table 2, a tire of Comparative Example 2 cannot be manufactured due to the increase in Mooney viscosity.

TABLE 3

| Example | 8 | | | | | | 9 | 10 | |
|---|---|---|---|---|---|---|---|---|---|
| Comparative Example | | 4 | 5 | 6 | 7 | 8 | | | 9 |
| Formulation (parts by weight) | | | | | | | | | |
| 1712*1 | 27.5 | — | 82.5 | — | 27.5 | 27.5 | — | — | — |
| 0120*2 | 110.0 | 40.5 | 55 | — | 110.0 | 110.0 | — | — | — |
| 0202*3 | — | 70 | — | 75 | — | — | 75 | 75 | 68 |
| TAFDEN 2530*4 | — | — | — | — | — | — | — | — | — |
| BR31*5 | — | — | — | 34.38 | — | — | 34.38 | 34.38 | 44 |
| carbon black*6 type | N134 | N134 | N134 | N234 | N134 | N134 | N134 | N134 | N134 |
| carbon black*6 amount | 70 | 70 | 70 | 100 | 65 | 20 | 35 | 50 | 35 |
| silica*7 | 60 | 30 | 30 | 0 | 70 | 30 | 25 | 60 | 25 |
| silane coupling agent type | C | C | C | — | C | C | C | C | C |
| silane coupling agent amount | 12.0 | 3.0 | 3.0 | — | 7.0 | 7.5 | 3.0 | 9.0 | 3.0 |
| aromatic oil | 12.5 | 39.5 | 12.5 | 40.6 | 12.5 | 12.5 | 40.6 | 40.6 | 38 |
| stearic acid | 1 | 1 | 1 | 1 | 1 | 1 | 1 | 1 | 1 |
| antioxidant*8 | 1.5 | 1.5 | 1.5 | 1.5 | 1.5 | 1.5 | 1.5 | 1.5 | 1.5 |
| zinc oxide | 3.0 | 3.0 | 3.0 | 3.0 | 3.0 | 3.0 | 3.0 | 3.0 | 3.0 |
| vulcanization accelerator DM*9 | 0.6 | 0.6 | 0.6 | 0.6 | 0.6 | 0.6 | 0.6 | 0.6 | 0.6 |
| vulcanization accelerator DPG*10 | 0.3 | 0.3 | 0.3 | 0.3 | 0.3 | 0.3 | 0.3 | 0.3 | 0.3 |
| vulcanization accelerator NS*11 | 2.3 | 2.3 | 2.3 | 2.3 | 2.3 | 2.3 | 2.3 | 2.3 | 2.3 |
| sulfur | 1.9 | 1.9 | 1.9 | 1.9 | 1.9 | 1.9 | 1.9 | 1.9 | 1.9 |
| master batch temperature (° C.) | 164 | 166 | 163 | 164 | 165 | 165 | 163 | 166 | 162 |
| Results of evaluation | | | | | | | | | |
| entire content of styrene | 32.7 | 41.2 | 28.1 | 34.5 | 32.7 | 32.7 | 34.5 | 34.5 | 31.3 |
| Mooney viscosity (index) | 99 | 93 | 94 | 94 | 102 | 72 | 84 | 96 | 89 |
| abrasion resistance (index) | 104 | 94 | 108 | 107 | 96 | 82 | 102 | 112 | 107 |
| dry grip (index) | 104 | 106 | 96 | 104 | 103 | 96 | 101 | 104 | 98 |
| wet grip (index) | 110 | 105 | 94 | 98 | 112 | 92 | 101 | 113 | 96 |

*1bonded styrene, 23.5% by weight, 37.5 parts oil-extended; emulsion polymerization styrene-butadiene copolymer rubber (SBR) (manufactured by JAPAN SYNTHETIC RUBBER Co., Ltd.)
*2bonded styrene, 35.0% by weight, 37.5 parts oil-extended, emulsion polymerization styrene-butadiene copolymer rubber (SBR) (manufactured by JAPAN SYNTHETIC RUBBER Co., Ltd.)
*3bonded styrene, 46.0% by weight, not oil-extended, emulsion polymerization styrene-butadiene copolymer rubber (SBR) (manufactured by JAPAN SYNTHETIC RUBBER Co., Ltd.)
*4bonded styrene, 25.0% by weight, 37.5 parts oil-extended, emulsion polymerization styrene-butadiene copolymer rubber (SBR) (manufactured by ASAHI CHEMICAL INDUSTRY Co., Ltd.)
*5Ni catalyst (37.5 parts oil-extended) high cis-butadiene rubber (manufactured by JAPAN SYNTHETIC RUBBER Co., Ltd.)
*6N134($N_2SA$: 142 $m^2$/g,DBP: 127 ml/100 g), N234($N_2SA$: 126 $m^2$/g, DBP: 125 ml/100 g) (manufactured by ASAHI CARBON Co., Ltd.)
*7NIPSIL AQ (manufactured by NIPPON SILICA INDUSTRIAL Co., Ltd.)
*8N-(1,3-dimethyl-butyl)-N'-phenyl-p-phenylenediamine
*9dibenzothiazylsulfide
*10diphenylguanidine
*11N-tert-butyl-2-benzothiazolylsulphenamide
mastermatch temperature: a measured temperature of masterbatch immediately after mixing Because the rubber composition of the present invention uses a silane coupling agent having a specific distribution of polysulfide, gelation of a polymer due to the silane coupling agent is suppressed during mixing at high temperatures of 150° C. or more without a decrease in workability. The rubber composition is widely used for various types of pneumatic tires having excellent wet skid resistance, grip performance on a dry road surface, and abrasion resistance.

What is claimed is:

1. A rubber composition which comprises:
   a rubber component comprising a styrene-butadiene copolymer rubber, or a blend of the styrene-butadiene copolymer rubber and another conjugated diene based rubber with the styrene-butadiene copolymer rubber being 70% by weight or more of the entire blend, and the entire content of styrene is 30 to 40% by weight of the entire rubber component;
   silica in an amount of 10 to 60 parts by weight per 100 parts by weight of the rubber component;
   in an amount of 1 to 20% by weight of the amount of silica, a silane coupling agent represented by following general formula (I):

$$(C_nH_{2n+1}O)_3Si-(CH_2)_m-S_y-(CH_2)_m-Si(OC_nH_{2n+1})_3 \quad (1)$$

wherein n represents an integer of 1 to 3, m represents an integer of 1 to 9, y represents a positive number of 1 or more and has a distribution, and in which the content of trisulfide silane component, where y is 3, is 20% or more based on the entire amount of the silane coupling agent, and the content of high polysulfide silane components, where y is 5 or a number larger than 5, is 50% or less based on the entire amount of silane coupling agent; and carbon black, the sum of the amount of silica and carbon black being 60 to 130 parts by weight per 100 parts by weight of the rubber component.

2. A rubber composition according to claim 1, wherein the amount of silica is 20 to 50 parts by weight per 100 parts by weight of the rubber component.

3. A rubber composition according to claim 1, wherein the amount of silane coupling agent is 3 to 15% by weight of the amount of silica.

4. A rubber composition according to claim 1, wherein the content of the trisulfide silane component, where y is 3, in the sulfide silane coupling agent molecule represented by general formula (1) is 30% or more based on the entire amount of the silane coupling agent, and the content of the high polysulfide silane components, where y represents 5 or a number larger than 5, is 40% or less based on the entire amount of the silane coupling agent.

5. A rubber composition according to claim 1, wherein the amount of styrene-butadiene copolymer rubber obtained by emulsion polymerization is 40% by weight or more of the percentage by weight of the styrene-butadiene copolymer rubber in the rubber component.

6. A rubber composition according to claim 1, wherein a nitrogen absorption specific surface area ($N_2SA$) of the carbon black is 120 to 160 $m^2/g$ and a dibutyl phthalate oil absorption (DBP) of the carbon black is 120 to 150 ml/100 g.

7. A pneumatic tire which is manufactured by using the rubber composition described in claim 1 for tread rubber.

8. A pneumatic tire which is manufactured by using the rubber composition described in claim 4 for tread rubber.

9. A pneumatic tire which is manufactured by using the rubber composition described in claim 5 for tread rubber.

10. A pneumatic tire which is manufactured by using the rubber composition described in claim 6 for tread rubber.

11. A rubber composition according to claim 1, wherein the content of the trisulfide silane component, where y is 3, in the silane coupling agent molecule represented by general formula (1) is 25% or more based on the entire amount of the silane coupling agent.

* * * * *

(12) EX PARTE REEXAMINATION CERTIFICATE (7468th)
United States Patent
Araki et al.

(10) Number: US 6,147,143 C1
(45) Certificate Issued: Apr. 27, 2010

(54) RUBBER COMPOSITION AND PNEUMATIC TIRE USING SAID RUBBER COMPOSITION

(75) Inventors: Shunji Araki, Tokyo (JP); Kazuhiro Yanagisawa, Tokyo (JP)

(73) Assignee: Bridgestone Corporation, Chuo-Ku, Tokyo (JP)

Reexamination Request:
No. 90/006,370, Aug. 30, 2002

Reexamination Certificate for:
Patent No.: 6,147,143
Issued: Nov. 14, 2000
Appl. No.: 08/934,197
Filed: Sep. 19, 1997

(30) Foreign Application Priority Data

Dec. 16, 1996 (JP) ............................................. 8-335975

(51) Int. Cl.
*C08K 9/06* (2006.01)
*C08K 3/04* (2006.01)
*C08K 3/36* (2006.01)
*C08K 5/54* (2006.01)
*B60C 11/00* (2006.01)

(52) U.S. Cl. ........................ 523/213; 523/212; 524/262; 524/493; 524/495; 152/209.1

(58) Field of Classification Search .................. 523/213, 523/212; 524/262, 493, 495; 152/209.1
See application file for complete search history.

(56) References Cited

U.S. PATENT DOCUMENTS

| 5,447,971 A | 9/1995 | Bergh et al. ................. 523/213 |
| 5,534,574 A | 7/1996 | Sandstrom et al. ........... 524/262 |
| 5,674,932 A | * 10/1997 | Agostini et al. ............. 524/430 |
| 5,817,852 A | 10/1998 | Ichinohe et al. ............. 556/427 |
| 5,877,249 A | * 3/1999 | Lambotte |

FOREIGN PATENT DOCUMENTS

| CA | 2104528 | 11/1994 |
| CA | 2129281 | 11/1995 |

OTHER PUBLICATIONS

Degussa AG Catalog Si 69 X50–S X50.

* cited by examiner

*Primary Examiner*—Tae H Yoon

(57) ABSTRACT

The present invention provides a rubber composition and a pneumatic tire using the rubber composition. The rubber composition which comprises: a rubber component comprising a styrene-butadiene copolymer rubber or a blend of the styrene-butadiene copolymer rubber and another conjugated diene base rubber with the styrene-butadiene copolymer rubber being 70% by weight or more of the entire blend, and the entire content of styrene is 30 to 40% by weight of the entire rubber component; silica in an amount of 10 to 60 parts by weight per 100 parts by weight of the rubber component; a specific silane coupling agent, i.e., a bis(alkoxysilylalkyl) polysulfide having a polysulfide chain in which the distribution of sulfur is specified, in an amount of 1 to 20% by weight of the amount of silica; and carbon black, the sum of the amount of silica and carbon black being 60 to 130 parts by weight per 100 parts by weight of the rubber component. The pneumatic tire has excellent wet skid resistance, excellent grip performance on a dry road surface, and excellent abrasion resistance.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–11 are cancelled.

\* \* \* \* \*